United States Patent
Kanayama

(10) Patent No.: US 9,246,577 B2
(45) Date of Patent: Jan. 26, 2016

(54) VEHICULAR COMMUNICATION APPARATUS

(71) Applicant: DENSO CORPORATION, Kariya, Aichi-pref. (JP)

(72) Inventor: Mitsuhiro Kanayama, Takahama (JP)

(73) Assignee: DENSO CORPORATION, Kariya (JP)

( * ) Notice: Subject to any disclaimer, the term of this patent is extended or adjusted under 35 U.S.C. 154(b) by 184 days.

(21) Appl. No.: 13/851,572

(22) Filed: Mar. 27, 2013

(65) Prior Publication Data

US 2013/0260696 A1    Oct. 3, 2013

(30) Foreign Application Priority Data

Mar. 28, 2012   (JP) .................................. 2012-74378

(51) Int. Cl.

| | |
|---|---|
| H04B 1/10 | (2006.01) |
| H04B 7/26 | (2006.01) |
| H04W 52/28 | (2009.01) |
| H04B 3/54 | (2006.01) |
| H04B 17/345 | (2015.01) |

(52) U.S. Cl.
CPC .................. *H04B 7/26* (2013.01); *H04B 3/548* (2013.01); *H04W 52/288* (2013.01); *H04B 17/345* (2015.01); *H04B 2203/547* (2013.01); *H04B 2203/5416* (2013.01); *H04B 2203/5483* (2013.01)

(58) Field of Classification Search
USPC ............ 455/63.1, 63.3, 114.2, 296, 297, 298, 455/310
See application file for complete search history.

(56) References Cited

U.S. PATENT DOCUMENTS

| 4,403,350 | A | * | 9/1983 | Imai et al. ...................... 455/297 |
|---|---|---|---|---|
| 5,056,153 | A | * | 10/1991 | Taniguchi et al. .......... 455/556.1 |
| 6,615,052 | B1 | * | 9/2003 | Parmenter ...................... 455/522 |
| 7,457,604 | B2 | * | 11/2008 | Patel .............................. 455/296 |
| 2004/0202113 | A1 | | 10/2004 | Moon et al. |
| 2005/0025188 | A1 | | 2/2005 | Numakura et al. |
| 2008/0113634 | A1 | * | 5/2008 | Gates et al. ................... 455/102 |
| 2009/0213802 | A1 | | 8/2009 | Miki et al. |

(Continued)

FOREIGN PATENT DOCUMENTS

| JP | 2-280419 | 11/1990 |
|---|---|---|
| JP | 2004-320240 | 11/2004 |

(Continued)

OTHER PUBLICATIONS

Office Action (2 pages) dated Mar. 4, 2014, issued in corresponding Japanese Application No. 2012-074378 and English translation (2 pages).

*Primary Examiner* — Nguyen Vo

(74) *Attorney, Agent, or Firm* — Nixon & Vanderhye P.C.

(57) ABSTRACT

A vehicular communication apparatus includes a communication device and an adjuster. The communication device exchanges a signal with an external communication device that is disposed external to the vehicle. The adjuster adjusts a transmission output of the communication device based on at least one of an operation mode of a vehicular device, which influences the communication device by generating a noise, or a classification of a signal exchanged between the communication device and the external communication device. The vehicular communication apparatus either prevents a deteriorated operation quality of the vehicular device or prevents a deteriorated communication quality of the communication device.

16 Claims, 7 Drawing Sheets

(56) References Cited

U.S. PATENT DOCUMENTS

| | | | |
|---|---|---|---|
| 2010/0049819 A1 | 2/2010 | Hamada et al. | |
| 2010/0312432 A1 | 12/2010 | Hamada et al. | |
| 2011/0022222 A1 | 1/2011 | Tonegawa | |
| 2011/0175569 A1* | 7/2011 | Austin | B60L 11/1824 320/109 |
| 2012/0262002 A1* | 10/2012 | Widmer | H02J 7/025 307/104 |

FOREIGN PATENT DOCUMENTS

| | | |
|---|---|---|
| JP | 2005-198094 | 7/2005 |
| JP | 2007-336496 | 12/2007 |
| JP | 2008-99085 | 4/2008 |
| JP | 2009-171700 | 7/2009 |
| JP | 2010-154179 | 7/2010 |
| WO | WO 03/041437 | 5/2003 |
| WO | WO 2008/099716 | 8/2008 |

* cited by examiner

VEHICULAR COMMUNICATION APPARATUS

CROSS REFERENCE TO RELATED APPLICATION

This application is based on and claims the benefit of priority of Japanese Patent Application No. 2012-74378 filed on Mar. 28, 2012, the disclosure of which is incorporated herein by reference.

TECHNICAL FIELD

The present disclosure generally relates to a vehicular communication apparatus for communicating with a device external to a vehicle.

BACKGROUND

A vehicular communication apparatus, which is disposed in a vehicle, communicates with devices that are external to the vehicle. For instance, Japanese Patent Laid-Open No. 2008-99085 discloses a vehicular communication apparatus that wirelessly communicates with a roadside unit that is disposed along a side of a road (i.e., road-to-vehicle communication) and wirelessly communicates with vehicular devices that are installed in other vehicles (i.e., vehicle-to-vehicle communication).

Vehicles are generally equipped with various devices, and some of the devices may generate a noise that affects the wireless communication between the vehicular communication apparatus and the roadside unit or the vehicular device in the other vehicle. In such a case, the wireless communication performed by the vehicular communication apparatus may deteriorate due to the noise generated by a vehicular device in the same vehicle. Further, the vehicular communication apparatus may also produce a noise that affects the operation of the vehicular devices and may deteriorate the quality of operation of the vehicular devices when the vehicular communication apparatus performs wireless communication.

The trouble caused by the above-described noises may be avoided by using noise suppression parts such as filter parts and/or shield parts. However, the effectiveness of the noise suppression parts has certain limitations, and a complete suppression of the noise by using such parts may be difficult. Further, the use of the noise suppression parts in the vehicular communication apparatus may be a cost increase in the manufacturing of such apparatus.

SUMMARY

In an aspect of the present disclosure, the vehicular communication apparatus includes a communication device and an adjuster. The communication device exchanges a signal with an external communication device disposed external to the vehicle that has the vehicular communication apparatus. The adjuster adjusts a transmission output of the communication device based on at least one of an operation mode of a vehicular device, which influences the communication device by generating a noise, or a classification of a signal that is exchanged between the communication device and the external communication device.

According to the above configuration, when the vehicular device is in operation and an operation mode of the vehicular device is susceptible to a signal transmission by the communication device, which is in the same vehicle, a transmission output of the communication device is adjusted so that the signal transmission by the communication device may not substantially affect or influence the operation of the vehicular device. In other words, the influence of the signal transmission by the communication device on the operation of the vehicular device is minimized.

Conversely, when the communication device in the vehicle and the external communication device outside of the vehicle exchange a signal and such signal has a particular classification, such as a high-importance or urgency, a transmission output of the communication device is adjusted so that the signal transmission by the communication device may not be substantially affected or influenced by the operation (i.e., an operation noise) of the vehicular device.

Therefore, the vehicular communication apparatus prevents deterioration of the communication quality of the communication device and the operation quality of the vehicular device without increasing cost.

The adjuster may further decide whether to adjust the transmission output based on the operation mode or adjust the transmission output based on the classification, when an adjustment instruction based on the operation mode is different from the adjustment instruction based on the classification. In particular, when the adjuster acquires information of the operation mode of the vehicular device from the vehicular device, the adjuster determines an operation mode adjustment information. The operation mode adjustment information is determined according to a correspondence between the operation mode acquired and a predetermined adjustment-required mode, which requires an adjustment of the transmission output of the communication device.

When the adjuster acquires information of the classification of the signal exchanged between the communication device and the external communication device, the adjuster determines a classification adjustment information. The classification adjustment information is determined according to a correspondence between the classification acquired and a predetermined adjustment-required classification, which requires an adjustment of the transmission output of the communication device.

The adjuster performs an adjustment determination to determine which adjustment information is to be used for adjusting the transmission output when both the operation mode adjustment information and the classification adjustment information are provided and when the operation mode adjustment information and the classification adjustment information are contrary to one another. The adjuster performs the adjustment determination according to a predetermined priority order between the operation mode and the classification of the signal, and adjusts the transmission output based on a result of the adjustment determination.

In such manner, even when adjustment information of the transmission output based on the operation mode of the vehicular device is different from the adjustment information of the transmission output based on the classification of the signal exchanged, the operation of the vehicular communication apparatus and the operation of the vehicular device are arbitrated suitably according to the situation at that moment.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

A vehicular communication apparatus in an embodiment of the present disclosure is descriptively illustrated in the following with reference to the drawings. In the present embodiment, a vehicle is equipped with a battery that is rechargeable. When recharging such battery, a communication apparatus in the vehicle performs a power line communication (PLC) through a power line that is connected to the vehicle to transmit electric power to the vehicle from a charge facility, such as a charge station that is external to the vehicle. However, the vehicular communication apparatus is not necessarily limited to a power line communication apparatus. That is, the vehicular communication apparatus of the present disclosure may be a wireless communication apparatus that performs wireless communication with a roadside unit or other vehicles. In other words, the communication considered in the present disclosure may either be wired or wireless.

Figure 1:
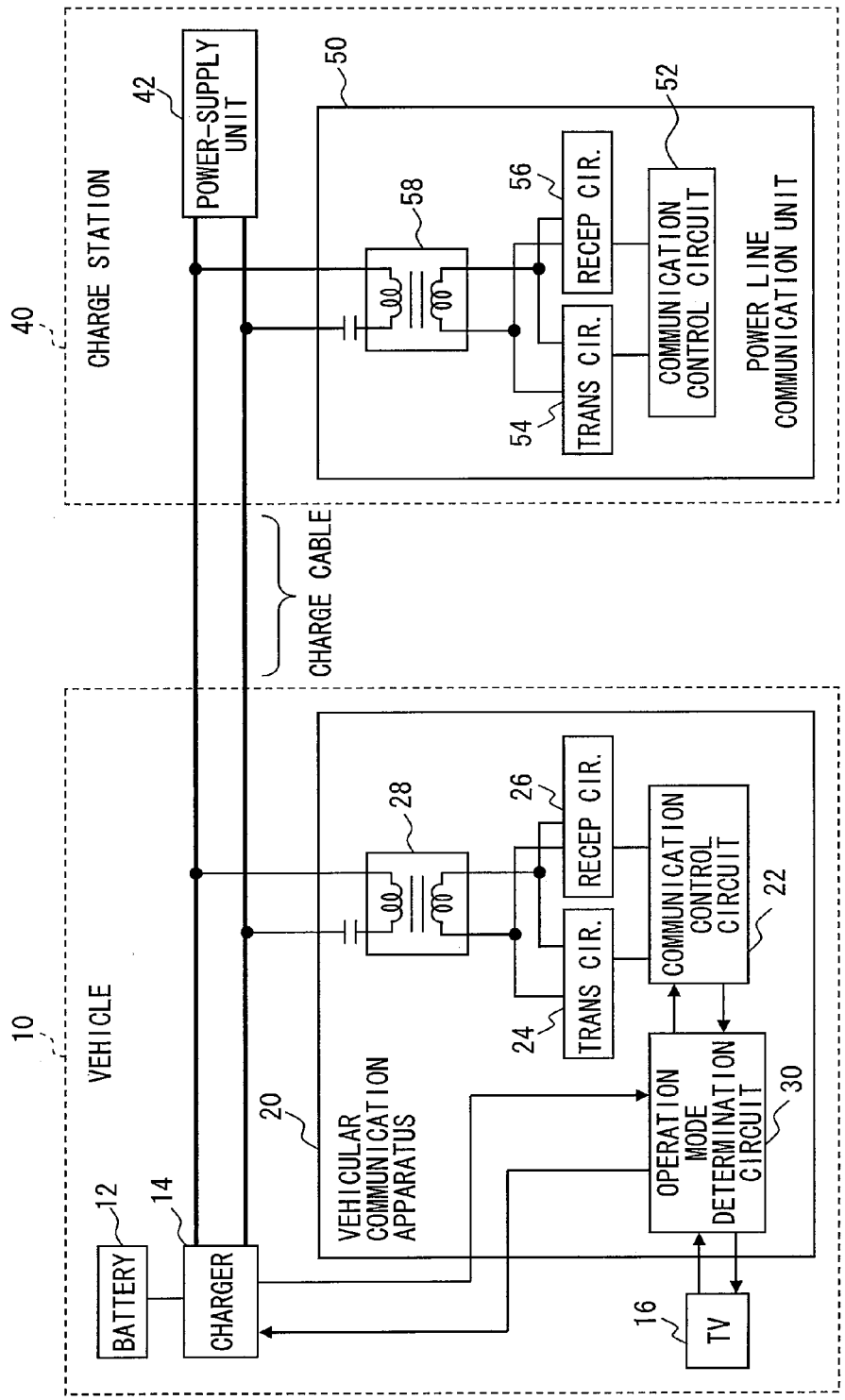
FIG. 1 is a block diagram of a vehicular communication apparatus and a charge station of the present disclosure.

With reference to FIG. 1, a vehicle 10 is equipped with, as vehicular devices, a battery 12 that supplies electric power to a motor (not illustrated) that is used to drive the vehicle, a charger 14 that charges the battery 12 by receiving electricity from a source external to the vehicle, and a television 16 installed in a vehicle compartment. The vehicular devices mentioned above are just examples, and the vehicle 10 may have other vehicular devices commonly found in the usual vehicle.

The vehicle 10 has a vehicular communication apparatus 20 that performs communication through a power line, which is used to charge the battery 12. The vehicular communication apparatus 20 has a communication control circuit 22 that generates data to be transmitted to a communication partner and that receives data, which is extracted from received signals transmitted by the communication partner. Further, the communication control circuit 22 adjusts a transmission output for transmitting signals from the vehicular communication apparatus 20 according to adjustment instructions from an operation mode determination circuit 30.

A transmission circuit 24 in the apparatus 20 modulates transmission data that is generated by the communication control circuit 22 according to a predetermined modulation method, such as orthogonal frequency division multiplexing (OFDM), and performs a D/A conversion for converting the modulated transmission data to a transmission signal. The transmission signal that is modulated and converted into analog by the transmission circuit 24 is then outputted to the power line through a pulse transformer 28, and is superposed onto a charge voltage signal. The pulse transformer 28 intercepts an intrusion of high voltage and protects an internal circuit of the vehicular communication apparatus 20, by having an insulation between the primary winding and the secondary winding.

A reception circuit 26 in the apparatus 20 receives a reception signal that is superposed on the charge voltage signal through the pulse transformer 28. The reception circuit 26 performs an A/D conversion of the reception signal, and then demodulates the A/D converted signal. The demodulated reception signal is provided as reception data to the communication control circuit 22. The reception circuit 26, the pulse transformer 28, and the transmission circuit 24 may be referred to as a communication device.

An operation mode determination circuit 30 in the apparatus 20 acquires, from various vehicular devices, information representing an operation mode of each of the vehicular devices. Further, the operation mode determination circuit 30 acquires, from the communication control circuit 22, information representing a classification or type of a signal transmitted to and received from the communication partner. Such information may be referred to as the classification of an exchanged signal, which includes the classification of the transmitted and received signal. Based on the information acquired, the operation mode determination circuit 30 determines whether it is necessary to adjust the transmission output when a signal is transmitted from the vehicular communication apparatus 20. When an adjustment of the transmission output is required, the operation mode determination circuit 30 outputs an adjustment instruction to the communication control circuit 22, instructing how such transmission output should be adjusted. The communication control circuit 22 and the operation mode determination circuit 30 may be referred to as an adjuster.

Based on the operation mode of the vehicular device, adjustment information regarding the adjustment of the transmission output may be generated. Similarly, adjustment information regarding the adjustment of the transmission output may be generated based on the classification of the exchanged signal. When the content of the adjustment information based on the operation mode of the vehicular device is different from the content of the adjustment information base on the classification of the exchanged signal, the operation mode determination circuit 30 determines, according to a predetermined priority order, which one of the adjustment information should be used for an adjustment instruction. In other words, the operation mode determination circuit 30 determines whether to use the adjustment information based on the operation modes of the vehicular device or to use the adjustment information based on the classification of the exchanged signal as a basis of the adjustment instruction. After selecting the adjustment information, the operation mode determination circuit 30 outputs the adjustment instruction that accords with the adjustment information to the communication control circuit 22.

In such manner, even when the adjustment information based on the operation mode of the vehicular device is different from the adjustment information based on the classification of the exchanged signal (e.g., even when one is contrary to the other), the operation of the vehicular communication apparatus 20 and the operation of the vehicular device are suitably arbitrated according to the situation at that moment. That is, whether (i) to prioritize the prevention of the deterioration of an operation quality of the vehicular device or (ii) to prioritize the prevention of the deterioration of a communication quality of the vehicular communication apparatus 20 in the adjustment of the transmission output is appropriately arbitrated and determined.

Figure 2:
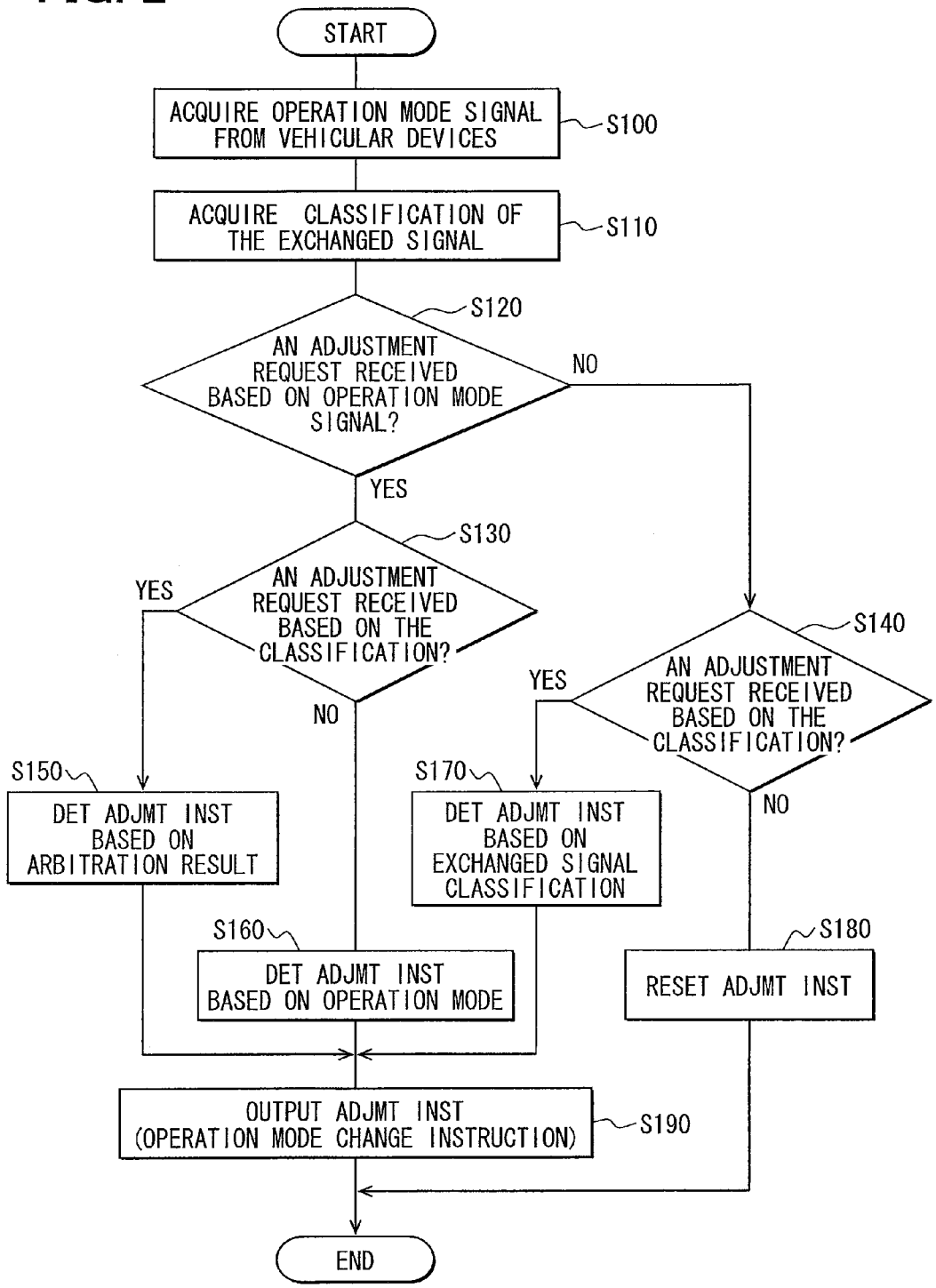
FIG. 2 is a flowchart of a process performed by an operation mode determination circuit of the vehicular communication apparatus.

With continuing reference to FIG. 2, the charge station 40 is equipped with a power-supply unit 42 that charges the battery 12 of the vehicle 10 by supplying electric power to the battery 12. The charge station 40 also has a power line communication unit 50 that performs communication through a power line. Similar to the vehicular communication apparatus 20, the power line communication unit 50 is equipped with a communication control circuit 52, a transmission circuit 54, a reception circuit 56, and a pulse transformer 58. The operation of these components is the same as the components in the apparatus 20. Therefore, the description of the operation these components is omitted form the present embodiment.

Figure 3:
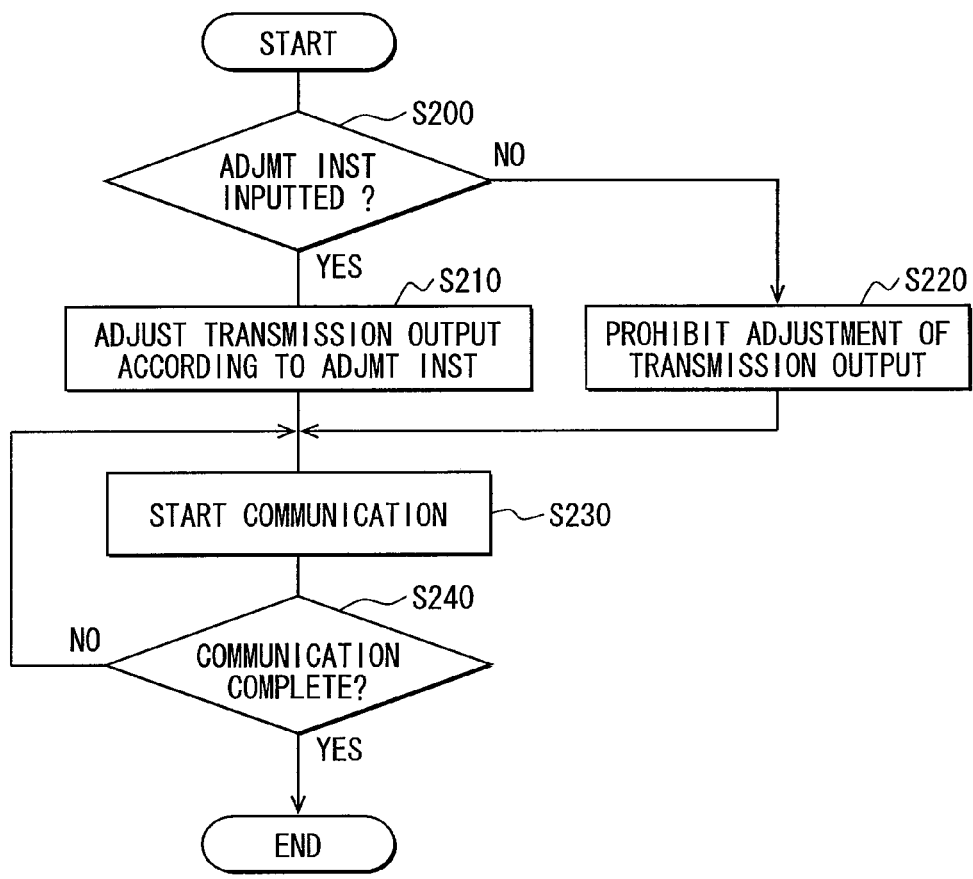
FIG. 3 is a flowchart of a process performed by a communication control circuit of the vehicular communication apparatus.
Figure 4:
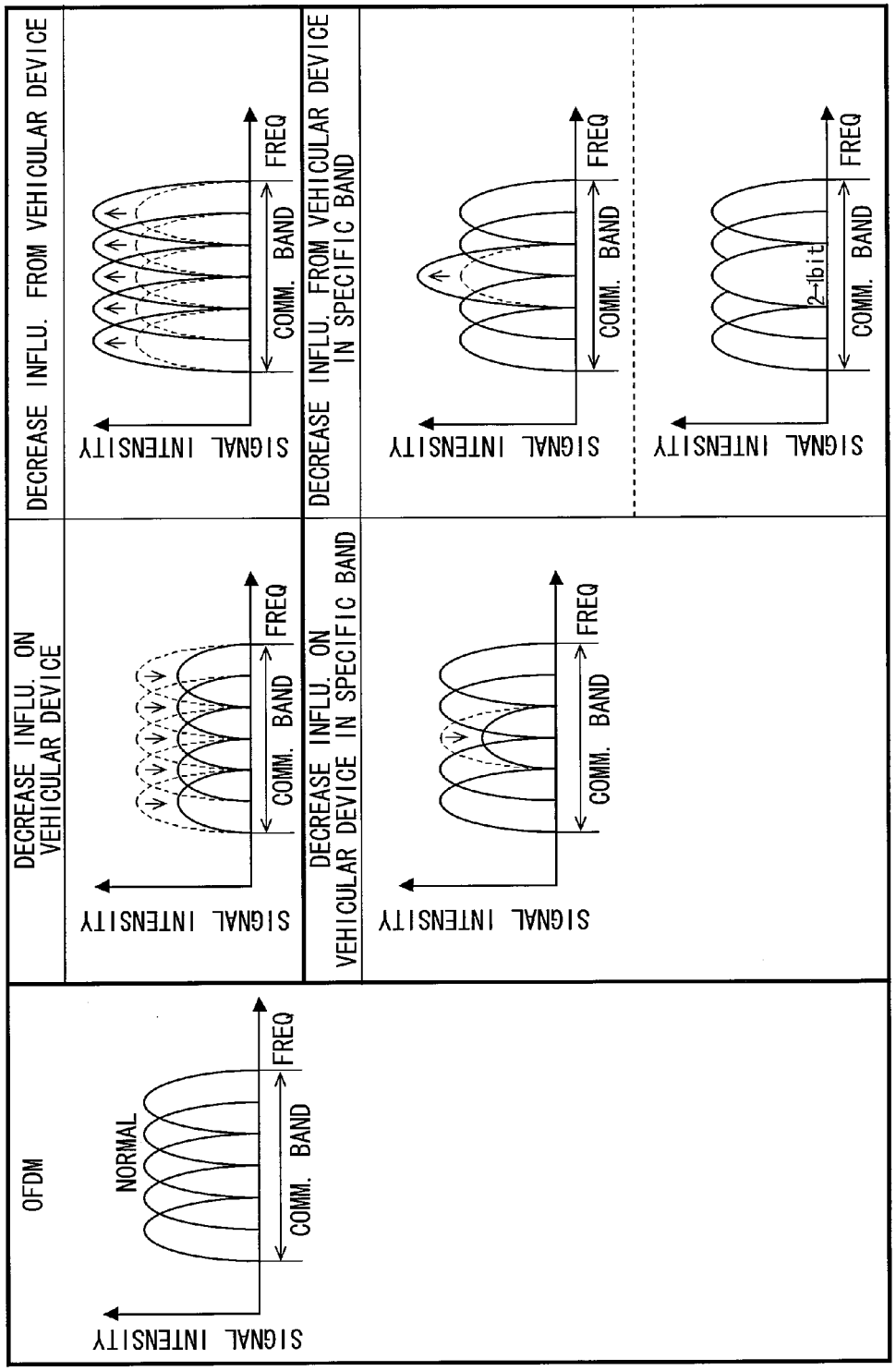
FIG. 4 is an illustration of an adjustment method for adjusting a transmission output when a modulation method is OFDM.

The processes performed by the operation mode determination circuit 30 and by the communication control circuit 22 of the vehicular communication apparatus 20 are now described in detail. A process performed by the operation mode determination circuit 30 is shown in FIG. 2, and a process performed by the communication control circuit 22 is shown in FIG. 3.

With reference to FIG. 2, the operation mode determination circuit 30, at S100, receives an operation mode signal from each of the vehicular devices, which represents the operation mode of each device. When no operation mode signal is received from a vehicular device, the operation mode determination circuit 30 determines that such vehicular device is not currently in operation.

At S110, information regarding the communication partner and the classification of the exchanged signal is acquired from the communication control circuit 22. When no communication is currently performed, the communication control circuit 22 provides no-communication notice.

Based on the operation mode received, the operation mode determination circuit 30 determines whether an adjustment of the transmission output, which is caused by the operation mode, is required. In other words, the determination circuit 30 determines whether the vehicular device has an adjustment request of the transmission output.

In particular, for each of the vehicular devices, the operation mode determination circuit 30 stores an operation mode that necessitates the adjustment of the transmission output in association with an adjustment form of how the transmission output is to be adjusted when the vehicular device is operating in such operation mode. If the operation mode received at S100 corresponds to the stored operation mode, the operation mode determination circuit 30 at S120 determines that the adjustment request exists. If the operation mode does not correspond to the stored operation mode, the operation mode determination circuit 30 at S120 determines that the adjustment request does not exist. If the vehicular device is not in operation, the operation mode will not be provided, thereby leading to the determination that the adjustment request does not exist at S120.

According to the operation mode of each of the vehicular devices, two types of adjustment forms are described.

A first form of adjustment weakens an intensity of the transmission signal and/or increases a communication interval in order to prevent interference with the operation of the vehicular device. In other words, the signal transmitted from the vehicular communication apparatus 20 is prevented from interfering with the vehicular device when the vehicular device is in operation.

For instance, a display refresh rate of the television 16, an operation clock frequency of a microcomputer, or an operation frequency of a power supply circuit may have a frequency close to the signal transmitted from the vehicular communication apparatus 20, which may possibly affect, for example, the viewing of the television 16. In such a case, the television 16 (i.e. a vehicular device) requests the first form of adjustment of the transmission output from the vehicular communication apparatus 20.

The second form of adjustment strengthens an intensity of the transmission signal and/or decreases communication intervals, so that the operation noise of the vehicular device does not affect with the communication of the vehicular communication apparatus 20 when the vehicular device is in operation.

For instance, when charging the battery 12, the charger 14 performs an AC/DC conversion (i.e., an AC/DC conversion may also be a DC/DC conversion in some cases) for generating an appropriate charge voltage, and may generate an operation noise that may affect or interfere with the communication of the vehicular communication apparatus 20. Accordingly, when the communication of the vehicular communication apparatus 20 is affected by the noise of the voltage conversion operation, the charger 14 (i.e., a vehicular device) requests the second form of adjustment of the transmission output. The charger 14 can generate the charge voltage without any hindrance even when, for example, the second form of adjustment strengthens an intensity of the transmission signal from the vehicular communication apparatus 20.

Based on the above, when the adjustment request exists, the operation mode determination circuit 30 proceeds to S130, and when no adjustment request exists, the operation mode determination circuit 30 proceeds to S140.

Based on the classification of the exchanged signal, which was acquired at S110, it is determined whether an adjustment of the transmission output from the vehicular communication apparatus 20 is required or not at S130. In other words, the operation mode determination circuit 30 determines whether the vehicular communication apparatus 20 received an adjustment request for adjusting the transmission output. For performing a determination process regarding the above determination, adjustment forms for adjusting the transmission output are predetermined according to various classifications of exchanged signals, and adjustment forms are stored in the operation mode determination circuit 30 in association with various classifications of exchanged signals.

For instance, a transmission signal having a high-importance classification or a high-urgency classification is associated with the second form of adjustment. Therefore, at a time of transmitting such high-importance signal, the influence from the vehicular device is minimized, and the possibility of interference with the communication by the vehicular communication apparatus 20 is decreased by performing the second form of adjustment. Further, a signal having a low-importance may be protected from interference by performing the first form of adjustment. In such manner, the influence of the vehicular communication apparatus 20 on the operation of the vehicular device is decreased.

When an adjustment request exists, the operation mode determination circuit 30 proceeds to S150, and when no adjustment request exists, the operation mode determination circuit 30 proceeds to S160.

At S150, the adjustment request from the vehicular device based on an operation mode and the adjustment request from the vehicular communication apparatus 20 based on the classification of the exchanged signal are both provided. Therefore, an arbitration between the two requests is performed at S150. Specifically, it is determined whether the adjustment information, which indicates the adjustment form required, for adjusting the transmission output based on the operation mode of the vehicular device is different from the adjustment information for adjusting the transmission output based on the classification of the exchanged signal. In particular, according to a predetermined priority order stored in the operation mode determination circuit 30, if the adjustment information based on the operation mode is different from the adjustment information based on the classification of the exchanged signal, which one of the two adjustment information should be prioritized is determined. Based on the priority determination, the adjustment instruction of the transmission output is determined.

When the adjustment information based on the operation mode of the vehicular device is contrary to the adjustment information based on the classification of the exchanged signal, the operation mode determination circuit 30 determines whether to prioritize the prevention of the deterioration of an operation quality of the vehicular device or to prioritize the prevention of the deterioration of a communication quality of the vehicular communication apparatus 20.

On the other hand, at S160, the operation mode determination circuit 30 determines the adjustment instruction of the transmission output simply based on the operation mode of the vehicular device, because the adjustment request is only coming from the vehicular device.

When no adjustment request is received based on the operation mode (S120 is No), the operation mode determination circuit 30, at S140, performs a determination, which is similar to the determination at S130, for determining whether the vehicular communication apparatus 20 received an adjustment request for adjusting the transmission output based on the classification of the exchanged signals acquired at S110. When an adjustment request exists, the operation mode determination circuit 30 proceeds to S170, and when no adjustment request exists, the operation mode determination circuit 30 proceeds to S180.

At S170, an adjustment instruction for adjusting the transmission output based on the classification of the exchanged signal is generated, because the adjustment of the transmission output is requested only by the vehicular communication apparatus 20. At S180, an adjustment instruction is reset, because no adjustment request for adjusting the transmission exists.

When the adjustment instruction ("ADJMT INST" in figures) for adjusting the transmission output is determined in one of S150, S160, and S170, the operation mode determination circuit 30 outputs the adjustment instruction to the communication control circuit 22 at S190. Further, when the adjustment instruction is the one that prioritizes the prevention of deterioration of the communication quality of the vehicular communication apparatus 20 (i.e., second form of adjustment), an operation mode change instruction for changing an operation mode of the vehicular device may also be outputted at the same time to the vehicular device.

For instance, when the vehicular device is the charger 14, the process outputs an operation mode change instruction to decrease a charge electric current (i.e., the voltage). In such manner, the influence of the operation noise from the vehicular device on the communication by the vehicular communication apparatus 20 is more securely decreased.

Now, with reference to FIG. 3, a control process performed by the communication control circuit 22 is described.

At S200, the communication control circuit 22 determines whether an adjustment instruction of the transmission output is provided by the operation mode determination circuit 30 and inputted to the communication control circuit 22. When the adjustment instruction is inputted, the adjustment instruction in the operation mode determination circuit 30 is reset (not shown) and the communication control circuit 22 proceeds to S210. When the adjustment instruction is not inputted to the communication control circuit 22, the communication control circuit 22 proceeds to S220.

At S210, the communication control circuit 22 performs an arbitration of the adjustment of the transmission output according to the adjustment instruction inputted. More practically, for the adjustment of the transmission output, an instruction of changing, for example, an intensity of the transmission signal, is provided to the transmission circuit 54. The details of the transmission output adjustment method are described later.

On the other hand, at S220, the communication control circuit 22 prohibits an adjustment of the transmission output, because no adjustment instruction is currently inputted.

At S230, the communication control circuit 22 starts to communicate with the communication partner. Therefore, when the transmission output has been adjusted, a transmission signal is transmitted according to the transmission output after the adjustment. Further, when the transmission output has been adjusted, the communication partner may be notified of the adjustment. Specifically, when the adjustment is different from a simple increase or decrease of the intensity of the transmission signal, the communication partner should be notified of such adjustment. Otherwise, if the communication partner is not aware of such adjustment, a reception failure of the transmitted data may occur.

At S240, the communication control circuit 22 determines whether communication with the communication partner is complete. When communication is not complete, the communication control circuit 22 continues communication by using the transmission output after the adjustment, and when communication is complete, the communication control circuit concludes the process of FIG. 3.

Based on FIGS. 4 to 7, an adjustment method of the transmission output is described in detail. First, an adjustment method of the transmission output in an OFDM modulation method is described based on FIG. 4.

OFDM modulation, which is well known, is a data transmission on many carrier waves (i.e., sub-carriers). OFDM modulation is advantageous because it allows a dense arrangement of sub-carriers, partially overlapping with each other without interference, based on the orthogonal property between sub-carriers.

To adjust the transmission output modulated in the OFDM method for the first form of adjustment, which decreases the influence of the vehicular communication apparatus 20 on the vehicular devices, all of the sub-carriers may have a uniformly decreased (i.e., weakened) signal intensity.

Alternatively, only one of the multiple sub-carriers in a specific waveband may have a weakened signal intensity. Such an adjustment method may be effective when the signal in such specific waveband strongly affects the operation of the vehicular device. Such an adjustment method will not likely affect the communication ability of the vehicular communication apparatus 20 and will still enable the reduction of the influence on the vehicular device, because the weakening of the signal intensity is limited only to the specific waveband of the sub-carriers.

As for the second form of adjustment, which decreases the influence from the vehicular device on the transmission signal, the adjustment of the transmission output in the OFDM modulation method may include uniformly increasing (i.e., strengthening) the signal intensity of all of the sub-carriers. Alternatively, only one of the multiple sub-carriers in a specific waveband may have a strengthened signal intensity.

Such an adjustment method may be effective when the signal in such specific waveband is made to have less influence from the vehicular device. Another option is to decrease the amount of data transmitted in one of the multiple sub-carriers. In such manner, an amount of communication data per communication band is changed, and the decreased amount of communication data under the influence of the noise from the vehicular device achieves the communication less prone to the interference. In this case, the decrease of the transmitted data amount by the sub-carriers leads to a decrease of the communication speed, as a trade-off of the noise proof-ness of the communication.

Further, in the above examples, prior to changing the signal intensity of a specific waveband of the sub-carriers or prior to decreasing the amount of transmitted data in a specific waveband of the sub-carriers, it is necessary to notify the communication partner of such adjustment.

Figure 5:
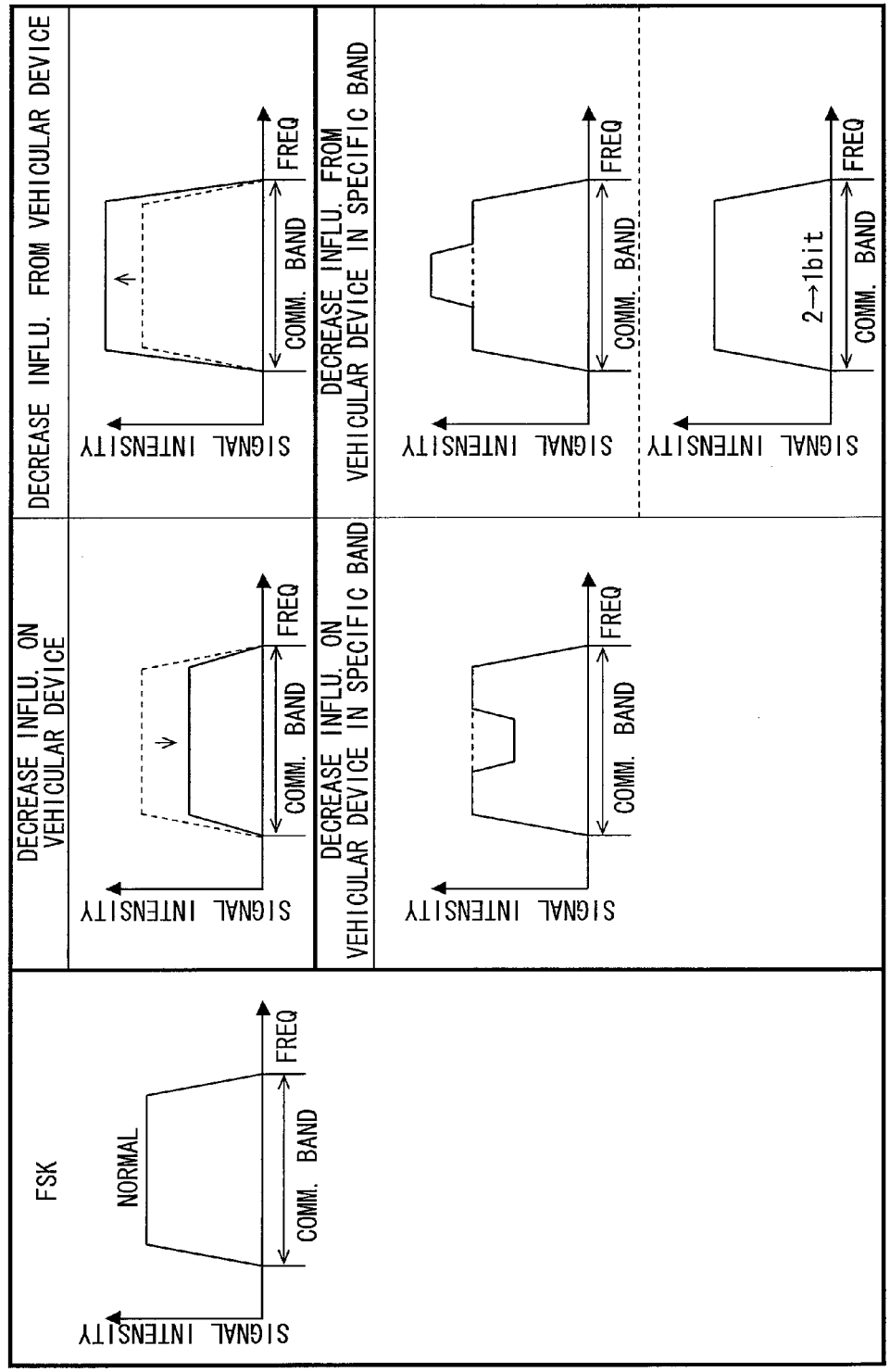
FIG. 5 is an illustration of an adjustment method for adjusting a transmission output when the modulation method is FSK.

Next, an adjustment method of the transmission output in a frequency shift keying (FSK) modulation method is described with reference to FIG. 5.

FSK is a method for representing information by combining waves having respectively different frequencies, each of those frequencies corresponding to a specific value. For example, if the FSK is used to represent binary signal, a combination of '0's (i.e., zero) represented by a low frequency and '1's represented by a high frequency is expressed by the change of the carrier wave frequency according to the signal value to be transmitted. In FIG. 5, the variation range of the carrier wave frequency is depicted as a communication band.

When such FSK modulation method is used, the transmission output adjustment can be performed substantially in the same manner as the OFDM. In other words, as for the first form of adjustment, the signal intensity may be decreased (i.e., weakened) for the entire communication band. Alternatively, only a specific portion of the entire communication band may have a weakened signal intensity.

As for the second form of adjustment, the signal intensity may be increased (i.e., strengthened) for the entire communication band. Further, for decreasing the influence from the vehicular device on the specific portion of the entire communication band, the signal intensity may be increased (i.e., strengthened) only for such portion of the entire communication band. Alternatively, the amount of the transmitted data may be decreased for such portion of the entire communication band. In such manner, i.e., by decreasing the amount of transmitted data, the amount of "under-influence" data is decreased, thereby achieving noise-proof communication that is not affected by the noise from the vehicular device.

Figure 6:
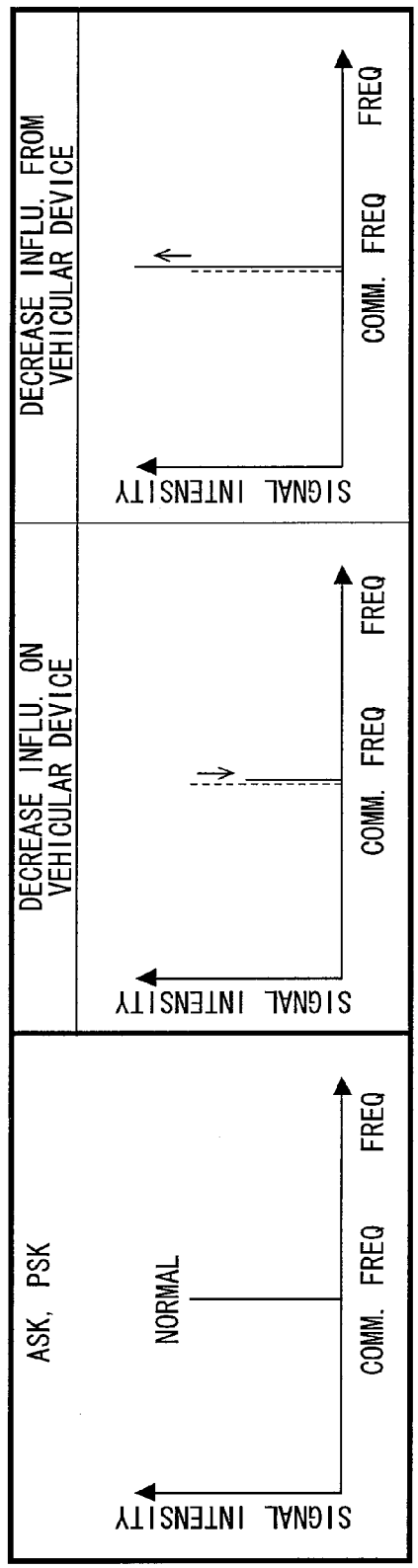
FIG. 6 is an illustration of an adjustment method for adjusting a transmission output when the modulation method is ASK or PSK.

With reference to FIG. 6, an adjustment method of the transmission output in an amplitude shift keying (ASK) modulation method and in a phase shift keying (PSK) modulation method is described.

ASK is a method for representing information by changing the amplitude of the carrier wave according to a signal value to be transmitted, and PSK is a method for representing information by changing the phase of the carrier wave according to a signal value to be transmitted. In these modulation methods, the frequency of the carrier wave (i.e., a communication frequency) is a constant as shown in FIG. 6.

As for the first form of adjustment in the ASK and PSK modulation methods, the signal intensity of the carrier wave is lowered. Conversely, for the second form of adjustment in the ASK and PSK modulation methods, the signal intensity of the carrier wave is increased (heightened). By performing such adjustment, the influence of the transmission signal on the vehicular device is decreased, or, the influence from the vehicular device on the transmission signal is decreased, respectively.

Figure 7:
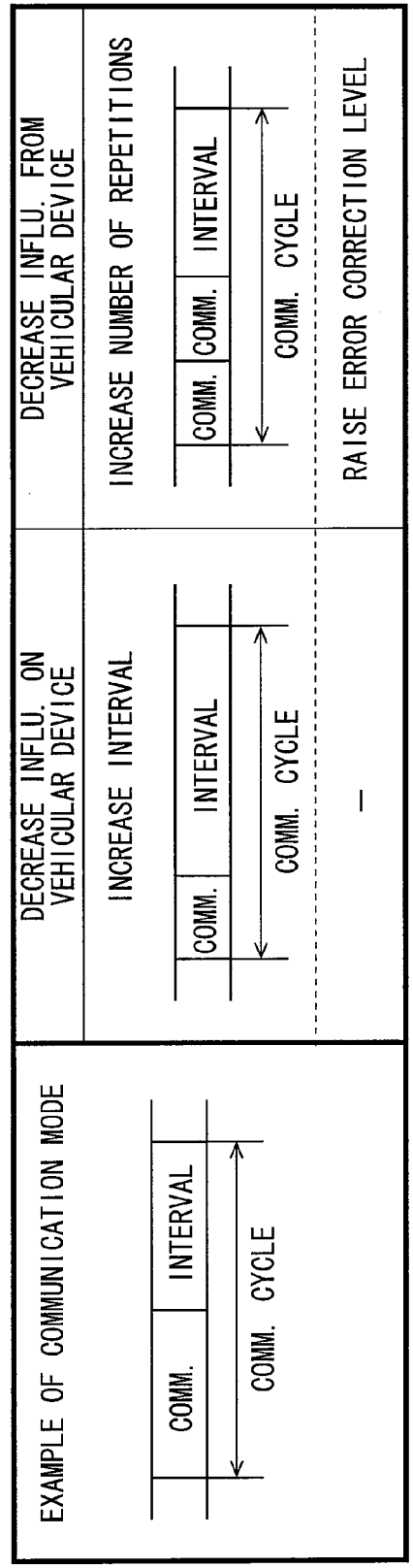
FIG. 7 is an illustration of an adjustment method for adjusting a transmission output when an in-vehicle communication apparatus performs a communication with a communication partner at certain intervals.

With reference to FIG. 7, an adjustment of the transmission output by changing the communication modes, such as communication intervals, or communication frequencies, is described. This kind of adjustment may be used for any modulation method.

For the adjustment in the first form, an interval of communication during which a communication operation is stopped, may be increased. In such a case, the frequency of communication is decreased, thereby decreasing the influence of the transmission signal on the vehicular device. However, a trade-off of the decreased communication speed due to the increase of the communication interval must be tolerated.

Conversely, for the adjustment in the second form, the number of repeated transmissions of the same content may be increased, or an error correction level may be raised by increasing the number of delay blocks (i.e., delay operators) in a convolution coding when detecting and correcting an error by using an error correction code. In such a case, a trade-off of the decreased communication speed due to the decrease of the amount of transmitted data per unit time may be tolerated.

Further, the change of the communication modes may not necessarily be limited to the above examples. That is, an initial interval having a predetermined interval length may be shortened, as the second form of adjustment. Further, an initial number of repeated transmissions may be increased, as the first form of adjustment, or may be decreased, as the second form of adjustment. Also, an error correction level may be lowered, as the first form of adjustment.

Although the present disclosure has been fully described in connection with the preferred embodiment thereof with reference to the accompanying drawings, it is to be noted that various changes and modifications will become apparent to those skilled in the art.

For instance, the adjustment of the transmission output performed in the above embodiment based on both of (i) the operation mode of the vehicular device and (ii) the classification of the exchanged signal that is transmitted between the vehicular communication apparatus 20 and the communication partner may be modified, and the adjustment of the transmission output may be performed based on only one of the above two, i.e., based either on (i) or (ii). Such a modification may be realized by omitting, from the flowchart in FIG. 2, one of the processes related to the operation mode of the vehicular device and to the classification of the exchanged signal, without omitting the other.

Such changes and modifications are to be understood as being within the scope of the present disclosure as defined by the appended claims.

What is claimed is:

1. A vehicular communication apparatus comprising:
   a communication device exchanging a signal with an external communication device disposed external to a vehicle having the communication device therein; and
   an adjuster adjusting a transmission output of the communication device based on an operation mode of a vehicular device influencing the communication device by generating a noise, wherein
   the adjuster outputs an operation mode change request to the vehicular device when an adjustment of the transmission output is performed to prevent deterioration of a communication quality of the communication device.

2. The vehicular communication apparatus of claim 1, wherein
the adjuster adjusts the transmission output of the communication device based on a classification of a signal exchanged between the communication device and the external communication device.

3. The vehicular communication apparatus of claim 2, wherein
the adjuster acquires information of the classification of the signal exchanged between the communication device and the external communication device, and
the adjuster adjusts the transmission output of the communication device when the classification corresponds to a predetermined type.

4. The vehicular communication apparatus of claim 1, wherein
the adjuster acquires information regarding the operation mode of the vehicular device from the vehicular device, and
the adjuster adjusts the transmission output of the communication device when the operation mode acquired corresponds to a predetermined mode.

5. The vehicular communication apparatus of claim 1, wherein
the adjuster changes a signal intensity in at least a part of a communication band to adjust the transmission output of the communication device.

6. The vehicular communication apparatus of claim 5, wherein
the adjuster notifies a communication partner of an adjustment through the communication device when adjusting the transmission output of the communication device.

7. The vehicular communication apparatus of claim 1, wherein
the adjuster changes a per-communication-band data amount of a transmission signal that is transmitted from the communication device to adjust the transmission output of the communication device.

8. The vehicular communication apparatus of claim 7, wherein
the adjuster notifies a communication partner of an adjustment through the communication device when adjusting the transmission output of the communication device.

9. The vehicular communication apparatus of claim 1, wherein
the adjuster changes a transmission interval of a transmission signal that is transmitted from the communication device to adjust the transmission output of the communication device.

10. The vehicular communication apparatus of claim 9, wherein
the adjuster notifies a communication partner of an adjustment through the communication device when adjusting the transmission output of the communication device.

11. The vehicular communication apparatus of claim 1, wherein
the adjuster changes a number of repeated transmissions of a transmission signal that is transmitted from the communication device to adjust the transmission output of the communication device.

12. The vehicular communication apparatus of claim 11, wherein
the adjuster notifies a communication partner of an adjustment through the communication device when adjusting the transmission output of the communication device.

13. The vehicular communication apparatus of claim 1, wherein
the adjuster changes a level of error correction of a transmission signal that is transmitted from the communication device to adjust the transmission output of the communication device.

14. The vehicular communication apparatus of claim 13, wherein
the adjuster notifies a communication partner of an adjustment through the communication device when adjusting the transmission output of the communication device.

15. A vehicular communication apparatus comprising:
an communication device exchanging a signal with an external communication device disposed external to a vehicle having the communication device therein; and
an adjuster adjusting a transmission output of the communication device based on an operation mode of a vehicular device influencing the communication device by generating a noise, wherein
the adjuster determines an operation mode adjustment information based on the operation mode when the adjuster acquires information of the operation mode of the vehicular device from the vehicular device, the operation mode adjustment information is determined according to a correspondence between the operation mode acquired and a predetermined adjustment-required mode, which requires an adjustment of the transmission output of the communication device,
the adjuster determines a classification adjustment information based on the classification when the adjuster acquires information of the classification of the signal exchanged between the communication device and the external communication device, the classification adjustment information is determined according to a correspondence between the classification acquired and a predetermined adjustment-required classification, which requires an adjustment of the transmission output of the communication device,
the adjuster performs an adjustment determination to determine which adjustment information is to be executed when both the operation mode adjustment information and the classification adjustment information are provided and when the operation mode adjustment information and the classification adjustment information are contrary to one another, the adjuster performs the adjustment determination according to a predetermined priority order between the operation mode and the classification of the signal, and
the adjuster adjusts the transmission output based on a result of the adjustment determination.

16. The vehicular communication apparatus of claim 15, wherein
the adjuster outputs an operation mode change request to the vehicular device when an adjustment of the transmission output is performed to prevent deterioration of a communication quality of the communication device.

* * * * *